No. 755,731. PATENTED MAR. 29, 1904.
M. W. ALEXANDER.
CONTROLLER FOR ELECTRIC MOTORS.
APPLICATION FILED JUNE 13, 1903.
NO MODEL. 4 SHEETS—SHEET 1.

Witnesses:
Frank G. Hattie
Alex F. Macdonald

Inventor
Magnus W. Alexander
By Albert G. Davis
Att'y

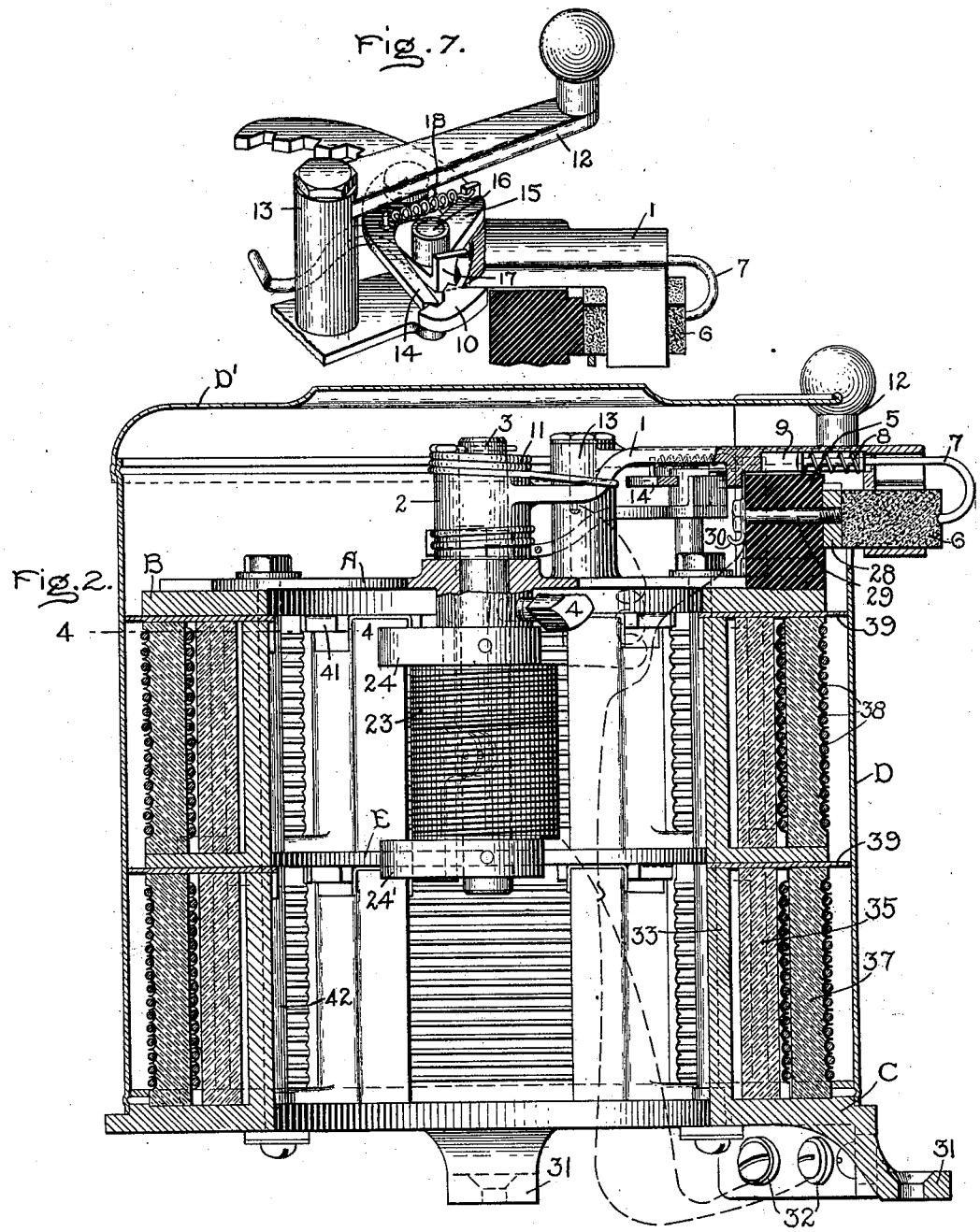

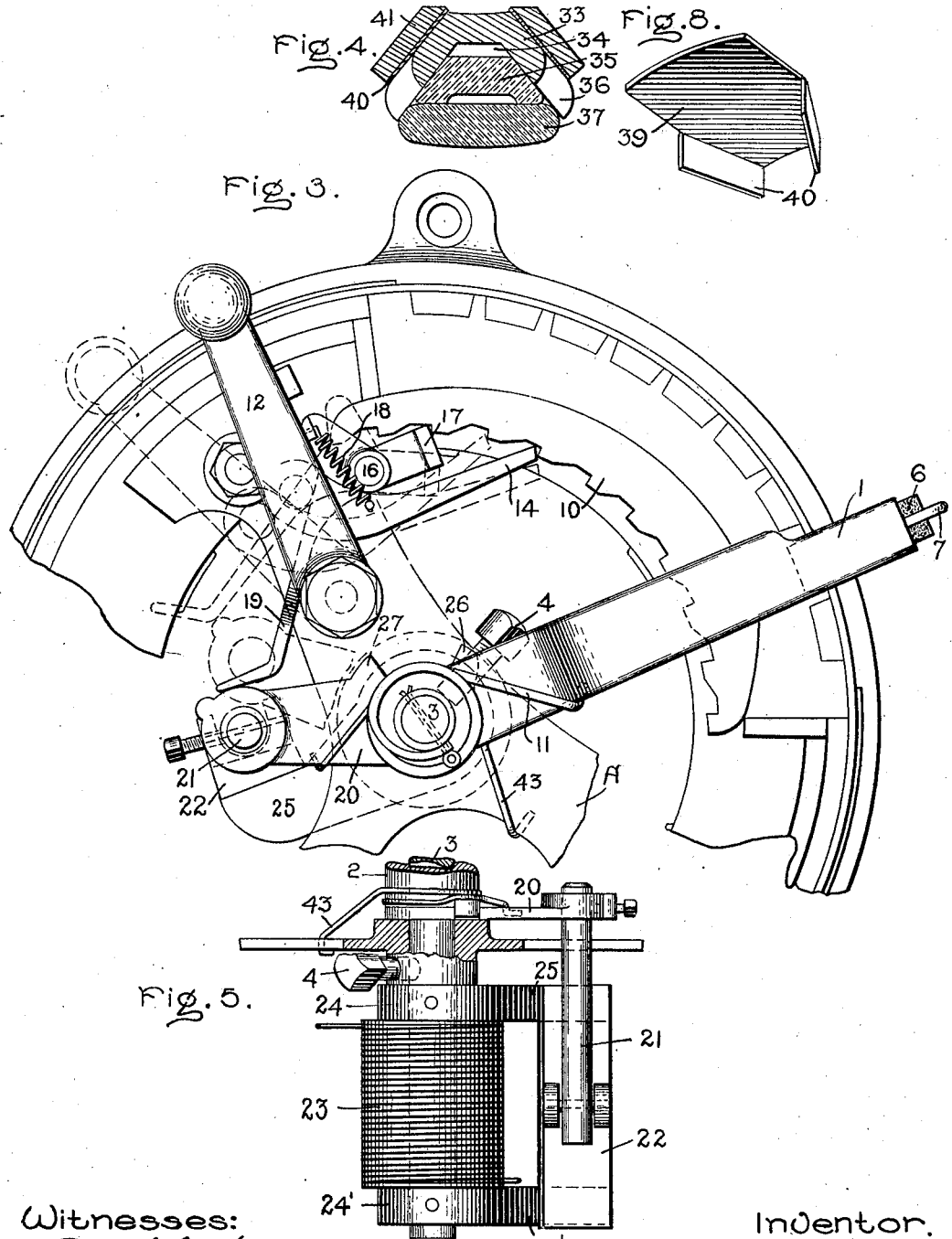

No. 755,731. PATENTED MAR. 29, 1904.
M. W. ALEXANDER.
CONTROLLER FOR ELECTRIC MOTORS.
APPLICATION FILED JUNE 13, 1903.
NO MODEL. 4 SHEETS—SHEET 4.

Witnesses
Frank G. Hattie.
Alex F. Macdonald.

Inventor.
Magnus W. Alexander.
By Albert G. Davis
Atty.

No. 755,731. Patented March 22, 1904.

UNITED STATES PATENT OFFICE.

MAGNUS W. ALEXANDER, OF LYNN, MASSACHUSETTS, ASSIGNOR TO GENERAL ELECTRIC COMPANY, A CORPORATION OF NEW YORK.

CONTROLLER FOR ELECTRIC MOTORS.

SPECIFICATION forming part of Letters Patent No. 755,731, dated March 29, 1904.

Application filed June 13, 1903. Serial No. 161,337. (No model.)

*To all whom it may concern:*

Be it known that I, MAGNUS W. ALEXANDER, a citizen of the United States, residing at Lynn, county of Essex, State of Massachusetts, have invented certain new and useful Improvements in Controllers for Electric Motors, of which the following is a specification.

The present invention relates to controllers for electric motors, and has for its object to provide a controller which cannot be held out of position when no current is flowing or operated to cut out resistance before the motor has had time to start; and a further object is to provide a resistance-drum of interchangeable parts whereby the cost of manufacture of controllers for special purposes is greatly reduced.

My invention comprises a strongly-biased contact-arm adapted to be stepped from contact to contact by an independent hand-lever and a connection between the contact-arm and hand-lever controlled by a magnetic-trip device so arranged that when the current fails or drops below a certain strength the contact-arm is disconnected from the hand-lever and immediately returns to its off position regardless of the position of the hand-lever, and the connection is held in inoperative position until the current is restored or attains sufficient strength.

The invention also comprises an air-cooled resistance-drum having a bottom or base plate, a top plate carrying the contacts and the movable parts of the controller, and one or more sections between said plates consisting of a plurality of supports upon which the resistance-conductor is wound.

The invention will be more readily understood by reference to the accompanying drawings, forming a part of this specification, in which—

Figure 1:
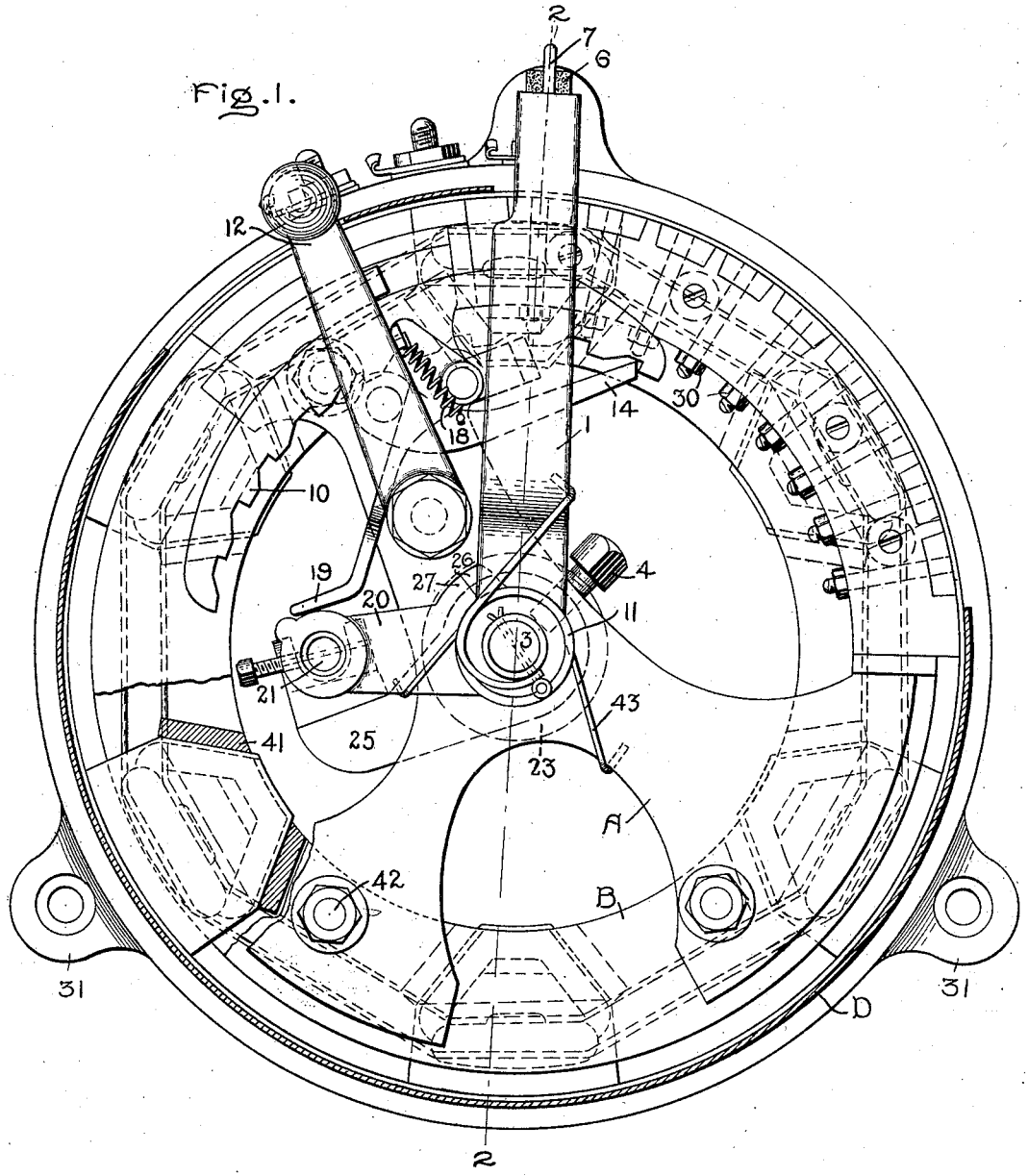
Figure 6:
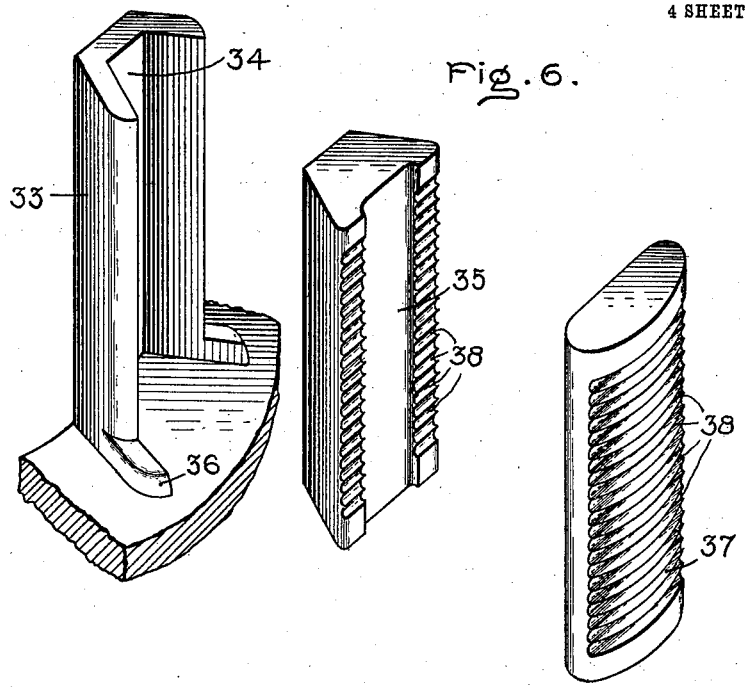
Figure 9:
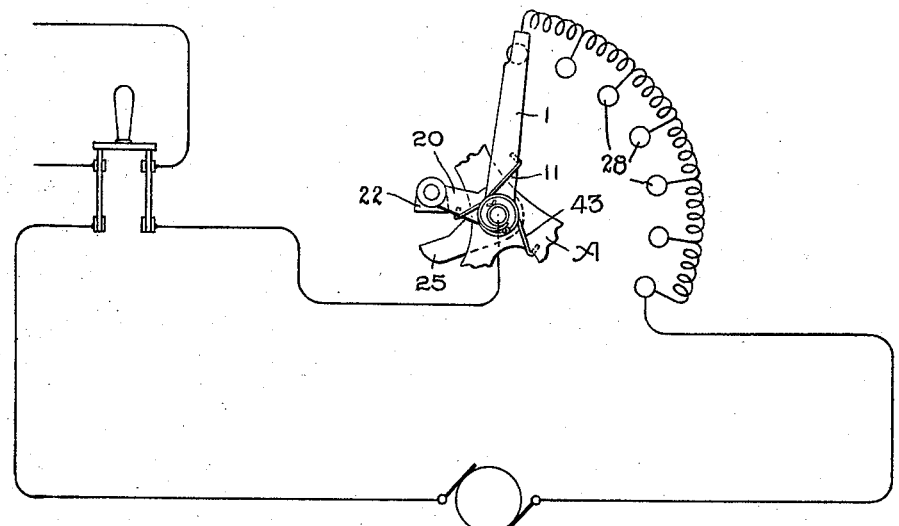

Figure 1 is a plan of a controller with the top of the inclosing shell and parts broken away embodying one form of my invention. Fig. 2 is a vertical section of the same on line 2 2 of Fig. 1. Fig. 3 is a part plan of the controller with the movable parts in connected and operative position. Fig. 4 is a section of the supporting-posts for the resistance-coil on line 4 4 of Fig. 2. Fig. 5 is an elevation of the trip-magnet and its armature. Fig. 6 is a detail perspective of the coil-supporting posts. Fig. 7 is a broken perspective of the hand-lever and contact-arm and their connecting mechanism. Fig. 8 is a perspective of a space-plate for holding the cylindrical shell in position relative to the resistance-drum, and Fig. 9 is a conventional diagram of circuit connections.

In the construction shown in the drawings the operative parts are mounted upon a spider A, carried by the top plate B of the resistance-drum. The contact-arm 1 is provided at its inner end with a sleeved bearing 2, which engages the upper end of a shaft 3, fixed in adjusted position in the hub of the spider A by a set-screw 4. The outer end of the contact-arm projects beyond and is offset to extend below the upper surface of the segmented contact-support 5 and carries in this offset end a carbon contact-brush 6 and tension means therefor, consisting of a hook-shaped plunger 7 and a spring 8, thrusting against a shoulder thereon, and a shoulder at the end of the cavity 9, in which the spring and plunger are located. The contact-arm is provided at a point intermediate its ends with a segmental rack 10 for a purpose set forth below, and surrounding the upper end of its sleeved bearing 2 is a coiled spring 11, with one end connected to the shaft 3 and the other end engaging the edge of the contact-arm and acting to move the arm 1 toward its off position.

The hand-lever 12 is pivoted at its inner end to a stud 13, carried by one of the spokes of the spider A, and has pivoted upon its under side a pawl 14, adapted to engage the teeth of the rack 10 and move the contact-arm 1 step by step when the hand-lever 12 is oscillated. A latch-lever 15 is pivoted upon a stud 16, carried by the spider-spoke upon which the hand-lever 12 is mounted and having the end of its short arm bent up to form a shoe 17, adapted when in one position to engage the teeth of the rack 10 and hold the contact-arm from returning to its off position and when in the other position to engage the connecting-pawl 14 and disengage it from the rack 10, whereby the contact-arm 1 is rendered free to return to its off position. The long arm of the latch-lever 15 is connected to the pawl 14 by means of a spring 18, whereby both the pawl 14 and the latch 15 are normally held in contact with the rack 10, and is extended rearwardly beneath the pawl 14 and provided at its end with a finger 19 for engaging a tripping-arm 20. The tripping-arm 20 is pivoted at its inner end upon the shaft 3 between the upper end of the spider-hub and the sleeve-bearing 2 of the contact-arm 1, and at its outer end, which is adapted to contact with the finger 19 of the latch-lever 15, it is provided with a vertical aperture and set-screw for adjustably supporting a brass spindle 21, which carries loosely at its lower end a magnet-armature 22. A magnet 23 is mounted upon the shaft 3 beneath the spider and between pole-pieces 24 and 24', fixed upon the shaft and provided with extensions or lugs 25 and 25' with radial faces for engaging the armature 22, which is in the form of a bar and of a length to bridge the space between the pole-pieces. The tripping-arm 20 is normally forced forward with the armature 22 out of contact with the magnet-poles 24 and 24' by means of a light coiled spring 43 engaging an edge thereof and one of the spokes of the spider. The contact-arm and the tripping-arm are provided with corresponding shoulders or abutments 26 and 27, which coact to force the tripping-arm 20 backward to bring its armature 22 into contact with the magnet pole-pieces 24 and 24' when the contact-arm 1 moves to its off position under the stress of its more powerful spring 11. If current of sufficient strength pass through the controller, the magnet 23 will hold the armature 22 and the tripping-arm 20 in the back or full line position shown in Fig. 3 against the tension of the spring 43, while the contact-arm 1 is actuated step by step to gradually cut out resistance by means of the hand-lever 12, pawl 14, and latch-lever 15. When the current fails or becomes insufficient to energize the magnet 23 with the force necessary to hold the armature 22 and the tripping-arm 20 from moving therefrom under stress of the spring 43, the outer end of the arm 20 comes in contact with the rear end 19 of the latch-lever 15 and throws it into the dotted-line position indicated in Fig. 3, thereby raising the forward end 17, and with it the pawl 14, from contact with the ratchet 10 and permitting the contact-lever to return to its off position under stress of its spring.

The segmental contact-block 5 is secured to the top plate B in any suitable manner and has a plurality of metallic contacts 28 set in recesses in its outer periphery and having bolts 29 connected therewith and extending radially through the block 5 and provided at their inner ends with binding-nuts 30, whereby contact is made with respective sections of the resistance-coil.

The resistance-drum consists of a bottom or base plate C, provided on its under side with feet 31 and binding-posts 32 and on its upper side with a series of equally-spaced posts 33, each provided with a channel 34 in its outer face for the reception of a block 35, of porcelain or other insulating material, and projections or lugs 36 are formed as extensions of the sides of the channels 34 at their lower ends, which serve to position the outer blocks 37, of porcelain. The outer faces of the porcelain blocks 35 and 37 are provided with transverse grooves 38 for the reception of the resistance-conductor, the said blocks being held in position by said conductor. Over the upper ends of the posts 33 and blocks 35 and 37 are placed space-plates 39, consisting of sheet-metal punchings having short ears 40, adapted to engage the inner sides of the posts 33 and being of a length to project beyond the outer block 37 a sufficient distance to engage the cylinder-shell D and hold it out of contact with the resistance-conductor. The top plate B has on its under surface pairs of guide-lugs 41, adapted to receive between them the space-plates 39, and thereby act as staying devices for the upper ends of the posts 33 and blocks 35 and 37. In case more than one drum-section is desired intermediate plates E are provided having projecting lugs 41 on their lower surfaces like those on the corresponding surface of the top plate B and posts 33 and lugs 36 on their upper surfaces like those on the upper surface of the bottom ring C. In Fig. 2 two of these sections are shown; but it is apparent that as many sections as desired may be superposed in the same manner. The several sections are securely held together by vertical rods 42 passing through the several plates B, C, and E and engaging nuts at their ends.

The entire apparatus, with the exception of the outer ends of the hand-lever 12 and the contact-arm 1, is inclosed by the sheet-iron shell D and its cover D', there being an aperture formed in the upper side of the shell through which the ends of the hand-lever 12 and contact-arm 1 project.

It is to be noted in the construction above described that the contact-arm is independent of the actuating hand-lever and cannot be held in an intermediate or full speed position after the current has been turned off or fallen below a predetermined minimum strength, in consequence of which it is impossible to injure the motor or controller by suddenly switching on the current when there is no counter electromotive force in the circuit.

My invention is capable of embodiment in various forms of controllers and is in no way restricted to the construction shown.

What I claim as new, and desire to secure by Letters Patent of the United States, is—

1. The combination with the contact-arm of a controller, of an independent actuating-lever having detachable connection with the said contact-arm, current-controlled means for releasing the connection between said arm and lever, and means to automatically return said arm to cut in resistance and restore said releasing means to operative position.

2. The combination with the contact-arm of a controller, of an independent actuating-lever having a pawl-and-ratchet connection with said contact-arm, current-controlled means for disengaging said pawl-and-ratchet connection, and means to automatically return said arm to cut in resistance and restore said disengaging means to operative position.

3. The combination with the contact-arm of a controller, of means to move said arm to its off position, an independent lever having a pawl-and-ratchet connection with said contact-arm, a latch to hold said arm in the respective positions to which it is moved by the said lever, and current-controlled means independent of said lever for tripping said latch and pawl to release said contact-arm.

4. The combination with the contact-arm of a controller, of a spring to move said arm to its off position, a segmental ratchet on said arm, an independent actuating-lever provided with a pawl adapted to engage said ratchet, a latch-lever pivoted upon a stationary part and adapted to engage said ratchet and hold said contact-arm in the respective positions to which it is moved by the said actuating-lever, and current-controlled means independent of said actuating-lever for tripping said latch-lever and pawl to release said controller-arm and permit it to return to its off position under the stress of its spring.

5. The combination with the contact-arm of a controller, of a spring to move said arm to its off position, a segmental ratchet connected to said arm, an independent actuating-lever provided with a pawl adapted to engage said ratchet, a latch-lever pivoted upon a stationary part and having a shoe on its front end adapted when moved in one direction to engage said pawl and when moved in the opposite direction to engage said ratchet and hold said contact-arm in the respective positions to which it is moved by the actuating-lever, a spring connecting the forward end of said pawl and rear end of said latch-lever, and current-controlled means for engaging said latch-lever to release said controller-arm from said latch and pawl.

6. The combination with the contact-arm of a controller, of an independent actuating-lever eccentrically pivoted with respect to said contact-arm, and a pawl-and-ratchet connection between said arm and lever whereby the contact-arm is moved step by step when the actuating-lever is oscillated.

7. The combination with the contact-arm of a controller, of a circular rack mounted upon said arm, an independent actuating-lever provided with a spring-pressed pawl adapted to engage said rack, a latch-lever pivotally mounted on a stationary pin and adapted to engage said rack when in normal position and to engage said pawl when moved out of engagement with said rack, and current-controlled releasing means for engaging said latch-lever to release said controller-arm upon abnormal condition of current.

8. In a controller, the combination of a series of contacts arranged in the surface of a cylinder, a contact-arm pivoted about the axis of said cylindrical surface and having its free end offset and provided with a carbon-brush, a hook-shaped plunger engaging said brush, and a spring carried in a recess in said arm and acting upon said plunger to force said brush into engagement with said contacts.

9. A support for resistance-coils comprising a bottom plate provided with a series of channeled posts, a top plate provided with lugs adapted to engage the tops of said posts, a series of insulating-blocks located in the channels of said posts and provided in their outer surfaces with transverse grooves for the reception of the resistance-wire, and means for clamping said plates in fixed relation.

10. A support for resistance-coils comprising a bottom plate provided with a series of channeled posts and guide-lugs, a top plate provided with guide-lugs, space-plates located between the tops of said posts and the top plate, a series of insulating-blocks located in the channels of said posts and adapted to support the inner coils, a second series of insulating-blocks superposed upon the aforementioned blocks and adapted to support the outer coils, and a casing surrounding said coils and engaging said space-plates.

In witness whereof I have hereunto set my hand this 11th day of June, 1903.

MAGNUS W. ALEXANDER.

Witnesses:
DUGALD McK. McKILLOP,
CHATTIN BRADWAY.